(12) United States Patent
Watkins et al.

(10) Patent No.: US 6,988,520 B2
(45) Date of Patent: Jan. 24, 2006

(54) MOTORCYCLE TIRE HAVING TREAD INCLUDING TWO DIFFERENT RUBBER COMPOUNDS

(75) Inventors: David Robert Watkins, Sutton Coldfield (GB); Gary Terence Barrett, Sutton Coldfield (GB)

(73) Assignee: The Goodyear Tire & Rubber Company, Akron, OH (US)

( * ) Notice: Subject to any disclaimer, the term of this patent is extended or adjusted under 35 U.S.C. 154(b) by 234 days.

(21) Appl. No.: 10/149,042

(22) PCT Filed: Dec. 1, 2000

(86) PCT No.: PCT/GB00/04582

§ 371 (c)(1),
(2), (4) Date: Jun. 3, 2002

(87) PCT Pub. No.: WO01/39998

PCT Pub. Date: Jun. 7, 2001

(65) Prior Publication Data

US 2003/0000616 A1    Jan. 2, 2003

(30) Foreign Application Priority Data

Dec. 4, 1999    (GB) .................................. 9928630

(51) Int. Cl.
*B60C 1/00* (2006.01)
*B60C 11/00* (2006.01)
*B60C 123/00* (2006.01)

(52) U.S. Cl. .............................. 152/209.5; 152/209.11; 152/526

(58) Field of Classification Search ............. 152/209.5, 152/209.11, 526
See application file for complete search history.

(56) References Cited

U.S. PATENT DOCUMENTS

| 4,311,179 | A | * | 1/1982 | Hayakawa et al. | ..... 152/209.11 |
| 4,319,620 | A | * | 3/1982 | Knill | ....................... 152/209.5 |
| 4,617,976 | A | * | 10/1986 | Kawajiri | ................. 152/209.11 |
| 4,683,928 | A | * | 8/1987 | Yahagi | ..................... 152/209.5 |
| 4,913,207 | A | * | 4/1990 | Harakon et al. | .......... 152/209.5 |
| 5,829,503 | A | * | 11/1998 | Watkins et al. | .............. 152/526 |
| 6,125,898 | A | * | 10/2000 | Watkins et al. | ........... 152/209.5 |
| 6,286,575 | B1 | * | 9/2001 | Nakamura | .................... 152/526 |

FOREIGN PATENT DOCUMENTS

JP            60-234004       * 11/1985

(Continued)

*Primary Examiner*—Steven D. Maki
(74) *Attorney, Agent, or Firm*—Richard B. O'Planick; David L. King

(57) ABSTRACT

A motor-cycle tire (1) comprising a ground contacting tread (2) reinforced between its edges (3,4) by a breaker assembly and having in its normally inflated fitted condition a camber value C/L of between 0.5 and 0.7, a reinforcing carcass ply (14) extending radially inside the breaker assembly and between two bead regions (10,11) and wrapped in each bead region around an annular bead core (12,13) from the axial inside to the outside to form carcass ply turn-ups (15,16) and between the tread edges (3,4) and bead regions (10,11), tire sidewalls (8,9) wherein the breaker assembly comprises two breaker plies (5,7) comprising reinforcing cords oppositely inclined with respect to the circumferential direction of the tire characterized in that the tread comprises two different rubber compounds, the first rubber compound extending in a continuous first layer between the tread edges (3,4) and the second rubber compound being disposed in a second layer radially outwardly of the layer of the first rubber compound to form the tread running surface in the central portion of the tread.

14 Claims, 1 Drawing Sheet

FOREIGN PATENT DOCUMENTS

Figure 1:
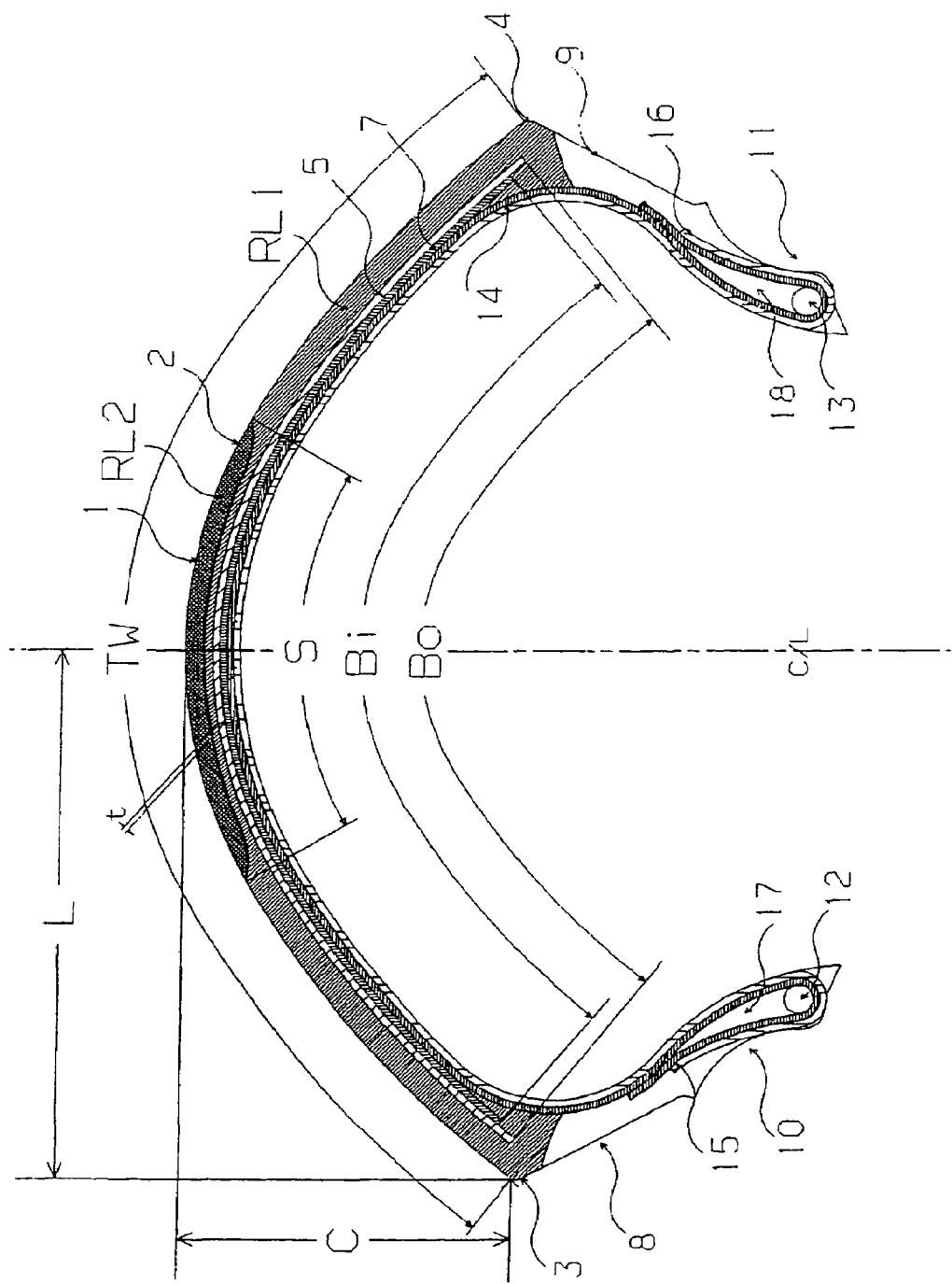

| | | | |
|---|---|---|---|
| JP | 61-211106 | * | 9/1986 |
| JP | 62-59105 | * | 3/1987 |
| JP | 4-95508 | * | 3/1992 |
| JP | 8-169208 | * | 7/1996 |

* cited by examiner

MOTORCYCLE TIRE HAVING TREAD INCLUDING TWO DIFFERENT RUBBER COMPOUNDS

This invention relates to radial motor-cycle tyres and in particular but not exclusively to high performance or race motor-cycle tyres.

Such tyres utilize very wide treads which in transverse cross-section are sharply curved to provide good contact with the road surface when the motor-cycle is steeply banked in cornering. Maintenance of a consistent ground contact area or 'tyre footprint' under all conditions is a major problem in determining general vehicle handling. Of particular importance in race motor-cycle tyres of radial construction is the provision of high cornering power with the good stability to maximise cornering speeds under race conditions.

Present radial motor-cycle race tyres have short sidewalls which extend to the tread edges radially and axially outwardly from the tyres beads. The beads provide engagement to the wheelrim on tapered bead seats. The sidewalls are reinforced by radial carcass plies which when tensioned by the inflation pressure act together with sidewall geometry to provide location of the curved tread regions to withstand cornering forces.

The sharply curved tread region of the tyre is specially reinforced by a reinforcing breaker to give the required structural rigidity to allow for banking over of the motor-cycle when cornering whilst giving sufficient flexibility to allow localised tread flattening in the ground contact patch for good road grip.

Also in the art EP-A-774 367 proposes the use of two different tread compounds for a motorcycle race tyre where one side of the tread is provided with high grip compound and the other side with a harder compound. The construction is prepared for race circuits where the majority of bends are in the same direction.

Also Japanese Patent Publication 61-211106 discloses a motorcycle tyre with a tread formed with three separate compound zones each of which is at full tread thickness.

Such tyres however, do not provide fully optimum performance with regard to tread durability. It therefore an object of the present invention is to improve the properties of such tyres.

By camber value is meant the ratio C/L between the radial distance C from the centre to the edge of the tyre tread and the axial distance L between the centre and edge of the tread.

Further aspects of the present invention will become apparent from the description of the following embodiments in conjunction with the attached diagrammatic drawing in which:

FIG. 1 shows in cross-section a 170/60 R17 radial motor-cycle tyre intended for high speed racing.

The tyre 1 of FIG. 1 comprises a pair of sidewalls 8 and 9 terminating in bead regions 10 and 11. Each bead region is reinforced by an inextensible annular bead core 12 and 13. Extending between each bead region is a tyre carcass reinforcement ply 14 which is anchored in each bead region by being turned around the respective bead core 12,13 laterally from the inside to the outside to form a ply turn-up 15,16. The carcass reinforcement ply 14 comprises a single ply of tyre fabric laid with nylon cords substantially radially. Each bead region 10,11 further comprises a hard rubber apex member 17,18 which is anchored to each respective bead core 12,13 and extends taperingly radially outwardly.

The carcass ply fabric of the present tyre may also comprise polyester, rayon or aramid cords. Further whilst a single ply carcass of cords at substantially 90° may be particularly advantageous in the case of tyres for the rear wheel of the motorcycle, for the front wheel a tyre with two plies of cords crossed at an angle of 70°–88° may be advantageous.

The tyre 1 has a camber value of 0.6 and comprises a convex thread region 2, having tread edges 3, 4, reinforced by a breaker assembly. The width TW of the tread is 220 mm measured along the outer surface. The breaker assembly comprises two breaker plies 5 and 7 each of which comprises Kevlar (Registered Trade Mark) aramid cord tyre fabric each of 2/165 TEX. The cords in each of the breaker plies 5 and 7 are oppositely inclined to each other at an angle of 25° to the circumferential direction of the tyre. The radially inner breaker ply 7 has a width 81 of 200 mm and is narrower than the radially outer breaker ply 5 which has a width Bo of 220 mm. The breaker plies may also comprise steel cords.

As evident from FIG. 1 the tread of the tyre comprises two distinct layers of rubber. The first rubber layer RL1 extends continuously between the tread edges 3 and 4.

In the central tread portion a second rubber layer RL2 is disposed radially outward of the first rubber layer RL1 and centred on the tyre circumferential centreline C/L.

The tread ground contacting surface comprises in the centre the rubber compound of the second rubber layer and to either side in the lateral regions a different rubber compound of the first rubber layer RL1. The portion of the first rubber layer RL1 extending radially inward of the second rubber layer has a thickness of 2 mm.

At the boundary between the first and second rubber layer is disposed an interfacial fabric layer which comprises in this embodiment a rubberised cut fabric ply. This ply comprises nylon cords disposed in mutually parallel configuration and at an angle of between 18°–30° preferably 25° to the tyre circumferential direction. In accordance with the invention the interfacial fabric may comprise other textile materials common in the art.

The second layer of rubber RL2 has a width S which is 40% of the tread width TW. According to the invention this width may be in the range of 30%–50%. If the second rubber layer width exceeds 50% of the tread width then the second rubber compound extends too far into the lateral regions of the tread and the cornering performance of the tyre deteriorates.

The compound properties of the rubber of the first layer RL1 are such that the material provides good grip on cornering whilst those of the rubber of the second layer RL2 are to give low temperature generation in straight running.

Preferably the properties of the rubber layer of RL1 are characterised by a hardness value at 100° C. of between 40–49 Shore 'A' and a tensile modulus at 100° C. and 300% extension of less than 5.0 MPa.

In contrast the properties of the second rubber layer RL2 are preferably a hardness value at 100° C. of not less than 50 Shore 'A' and a tensile modulus at 100° C. and 300% extension of not less than 5.0 MPa.

Example formulations of rubber compounds suitable for the invention are shown in Table 1.

The formulation A is a compound suitable for the softer first rubber layer RL1 whilst compound B is suitable for the harder second rubber layer RL2.

The polymer type can be emulsion or solution polymerised styrene butadiene (SBR) and may contain 20–50% styrene, preferably 25–45%.

The reinforcing filler may be either carbon black as shown or silica or a blend of both. The total amount of filler present may be from 15 to 160 parts by weight per hundred parts by weight of styrene-butadiene rubber. Preferably the filler is present in an amount from 30 to 120 parts of the rubber. If silica is used, then this may be in conjunction with a coupling agent, preferably a silane coupling agent, e.g. bis 1,3-triethoxy-silyl propyl tetrasulphide. Silica may have a surface area 60–300 m$^2$/g, preferably 80–250 m$^2$/g and is preferably precipitated silica. The coupling agent may be used in the amount from 2–18.5% by weight of silica filler, preferably 5–12% by weight.

The carbon black may be a high surface area carbon black of SAF or ISAF type, having a surface area 80–300 m$^2$/g and be present at 15 to 160 and preferably 30 to 120 parts by weight per 100 parts by weight of styrene-butadiene rubber.

The oil in the composition is preferably an aromatic oil and may be present from 10 to 180 parts by weight per hundred rubber, preferably 15 to 120. Suitable aromatic oils are well known to a man skilled in the art. Preferably they have a specific gravity from 0.95–1.0.

The rubber compounds may contain conventional additives, e.g. accelerators, activators, extenders and anti-degradants as desired. The vulcanisation agent is preferably sulphur or a sulphur-containing compound.

The resultant tyres have been found to have good precision under the slower speed involved in cornering and due to the lower temperature generation in the second rubber compound the tyre also has improved durability at high speed running.

Whilst the presence of the interfacial fabric is preferred most of the advantages of the present invention can be obtained if it is omitted.

TABLE 1

|  | A | B |
| --- | --- | --- |
| Solution SBR | 145 | 145 |
| Carbon black | 90 | 109 |
| Aromatic oil | 44 | 44 |
| Zinc oxide | 4.0 | 4.0 |
| Stearic acid | 1.3 | 1.3 |
| Anti-degradants | 4.0 | 4.0 |
| Processing aid | 3.0 | 3.0 |
| Accelerator | 2.6 | 3.3 |
| Sulphur | 1.5 | 1.9 |

What is claimed is:

1. A motor-cycle tyre (1) comprising a ground contacting tread (2) reinforced between its edges (3, 4) by a breaker assembly and having in its normally inflated fitted condition a camber value C/L of between 0.5 and 0.7, a reinforcing carcass ply (14) extending radially inside the breaker assembly and between two bead regions (10, 11) and wrapped in each bead region around an annular bead core (12, 13) from the axial inside to the outside to form carcass ply turn-ups (15, 16) and between the tread edges (3, 4) and bead regions (10,11), tyre sidewalls (8,9) wherein the breaker assembly comprises two breaker plies (5,7) comprising reinforcing cords oppositely inclined with respect to the circumferential direction of the tyre characterised in that the tread comprises two different rubber compounds, a first rubber compound extending in a continuous first layer between the tread edges (3, 4) and a second rubber compound disposed in a second layer radially outwardly of the layer of the first rubber compound to form the tread running surface in the central portion of the tread, centered on the tyre axial centreline, having a width (S) of between 30% and 50% of the tread width (TW), the widths being measured along the arc of the tread surface and an interfacial fabric layer comprising reinforcing cords disposed at the boundary between the first and second rubber layers, the cords of the fabric layer are laid parallel to each other and disposed at an angle of 18°–30° to the tread circumferential direction and radial thickness of the second layer of rubber is between 50% and 80% of the total radial thickness of the tread.

2. A tyre according to claim 1, characterised in that the interfacial fabric layer comprises nylon cords.

3. A tyre according to claim 1, characterised in that the radial thickness (t) of the portion of first rubber layer radially inward of the second layer is not less than 2 mm.

4. A tyre according to claim 1, characterised in that the hardness of the rubber of the first rubber layer (RL1) at 300° C. lies in range 40 degrees to 49 Shore 'A'.

5. A tyre according to claim 1 characterised in that the first rubber layer (RL1) has a tensile modulus at 300% extension at 100° C. of less than 5.0 Mpa.

6. A tyre according to claim 1 characterised in that the rubber of the second rubber layer (RL2) has a hardness at 100° C. of not less than 50° Shore 'A'.

7. A tyre according to claim 1 characterised in that the rubber of the second rubber layer (RL2) has a tensile modulus at 300% extension at 100° C. of not less than 5.0 Mpa.

8. A tyre according to claim 1 wherein the interfacial fabric layer lies between a medial portion of the second rubber layer and the first rubber layer on the centerline of the tread.

9. A tyre according to claim 8 wherein the second rubber layer has a radial thickness on the centerline of the tread greater than the radical thickness of the second rubber layer at outer ends thereof.

10. A motor-cycle tyre (1) comprising a ground contacting tread (2) reinforced between its edges (3, 4) by a breaker assembly, a reinforcing carcass ply (14) extending radially inside the breaker assembly and between two bead regions (10, 11) and wrapped in each bead region around an annular bead core (12, 13) from the axial inside to the outside to form carcass ply turn-ups (15, 16) and between the tread edges (3, 4) and bead regions (10,11), tyre sidewalls (8,9) wherein the breaker assembly comprises two breaker plies (5,7) comprising reinforcing cords oppositely inclined with respect to the circumferential direction of the tyre characterised in that:

the tread comprises two different rubber compounds, a first rubber compound extending in a continuous first layer between the tread edges (3, 4) and a second rubber compound disposed in a second layer radially outwardly of the layer of the first rubber compound to form the tread running surface in the central portion of the tread, centered on the tyre axial centreline, having a width (S) of between 30% and 50% of the tread width (TW), the widths being measured along the arc of the tread surface;

the tread further comprising an interfacial fabric layer comprising reinforcing cords disposed at a medial portion of a trough shaped boundary between the first and second rubber layers at the centerline of the tread, the cords of the fabric layer are laid parallel to each other and disposed at an angle of 18°–30° to the tread circumferential direction and radial thickness of the second layer of rubber is between 50% and 80% of the total radial thickness of the tread.

11. A tyre according to claim 10, wherein the radial thickness of a medial portion of the second rubber layer on the centerline of the tread greater than the radial thickness of the second rubber layer.

12. A tyre according to claim 11, wherein the interfacial fabric layer underlies the relatively thicker medial portion of the second rubber layer on the centerline of the tread.

13. A motor-cycle tyre (1) comprising a ground contacting tread (2) reinforced between its edges (3, 4) by a breaker assembly and having in its normally inflated fitted condition a camber value C/L of between 0.5 and 0.7, a reinforcing carcass ply (14) extending radially inside the breaker assembly and between two bead regions (10, 11) and wrapped in each bead region around an annular bead core (12, 13) from the axial inside to the outside to form carcass ply turn-ups (15, 16) and between the tread edges (3, 4) and bead regions (10,11), tyre sidewalls (8,9); wherein the breaker assembly comprises two breaker plies (5,7) comprising reinforcing cords oppositely inclined with respect to the circumferential direction of the tyre characterised in that:

the tread comprises two different rubber compounds, a first rubber compound extending in a continuous first layer between the tread edges (3, 4) and a second rubber compound disposed in a second layer radially outwardly of the layer of the first rubber compound to form the tread running surface in the central portion of the tread, centered on the tyre axial centreline, having a width (S) of between 30% and 50% of the tread width (TW), the widths being measured along the arc of the tread surface;

an interfacial fabric layer comprising reinforcing cords disposed at a medial boundary between the first and second rubber layers, the cords of the fabric layer are laid parallel to each other and disposed at an angle of 18°–30° to the tread circumferential direction and radial thickness of the second layer of rubber is between 50% and 80% of the total radial thickness of the tread;

wherein the hardness of the rubber of the first rubber layer (RL1) at 100° C. lies in range 40 degrees to 49 degrees Shore 'A' and the rubber of the second rubber layer (RL2) has a hardness at 100° C. of not less than 50° Shore 'A'.

14. A tyre according to claim 13 wherein the boundary between the first and second rubber layers is truogh shaped, the radial thickness of a medial portion of the second rubber layer at the centerline of the tread's greater than the radial thickness of the second rubber layer at outer end thereof.

* * * * *